(12) United States Patent
Diaz et al.

(10) Patent No.: US 8,106,340 B1
(45) Date of Patent: Jan. 31, 2012

(54) GENERALIZED MIDCOURSE MISSILE GUIDANCE

(75) Inventors: Frederick U. Diaz, Philadelphia, PA (US); Jeffrey B. Boka, Lumberton, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 401 days.

(21) Appl. No.: 12/395,830

(22) Filed: Mar. 2, 2009

(51) Int. Cl.
*F41G 7/00* (2006.01)
*F42B 15/01* (2006.01)
*F42B 15/10* (2006.01)
*F42B 15/00* (2006.01)

(52) U.S. Cl. ............. 244/3.15; 89/1.11; 342/61; 342/62; 244/3.1; 244/3.11; 244/3.14; 244/3.16; 244/3.19

(58) Field of Classification Search ............ 244/3.1–3.3; 89/1.1, 1.11; 342/61, 62, 175, 195, 52–56; 102/473, 475, 489
See application file for complete search history.

(56) References Cited

U.S. PATENT DOCUMENTS

| | | | | |
|---|---|---|---|---|
| 6,990,885 | B2 * | 1/2006 | Boyd | 89/1.11 |
| 7,026,980 | B1 | 4/2006 | Mavroudakis et al. | |
| 7,394,047 | B1 * | 7/2008 | Pedersen | 244/3.1 |
| 7,473,876 | B1 * | 1/2009 | Pedersen et al. | 244/3.1 |
| 7,511,252 | B1 * | 3/2009 | Pedersen et al. | 244/3.1 |
| 7,791,006 | B2 * | 9/2010 | Hasson et al. | 244/3.15 |
| 7,886,646 | B2 * | 2/2011 | Bannasch et al. | 89/1.11 |
| 2003/0172832 | A1 * | 9/2003 | O'Dwyer | 102/475 |
| 2006/0000348 | A1 * | 1/2006 | Boyd | 89/1.11 |
| 2006/0065150 | A1 * | 3/2006 | O'Dwyer | 102/475 |
| 2007/0159379 | A1 * | 7/2007 | Bannasch et al. | 342/61 |
| 2008/0258004 | A1 * | 10/2008 | Hasson et al. | 244/3.22 |

OTHER PUBLICATIONS

Pedersen, "Multihypothesis Boost-Phase Missile Defense Engagement Planner," U.S. Appl. No. 11/430,644, filed May 9, 2006.
Pedersen, "Interceptor Guidance for Boost-Phase Missile Defense," U.S. Appl. No. 11/430,646, filed May 9, 2006.
Pedersen, "Boost-Phase Intercept Missile Fire Control System Architecture," U.S. Appl. No. 11/430,647, filed May 9, 2006.
Pedersen, "Multihypothesis Threat Missile Propagator for Boost-Phase Missile Defense," U.S. Appl. No. 11/430,535, filed May 9, 2006.
Mavroudakis, et al., "Missile Identification and Tracking System and Method," U.S. Appl. No. 11/072,902, filed Mar. 4, 2005.
Luu, T., "Template Updated Boost Algorithm," U.S. Appl. No. 11/189,234, filed Jul. 26, 2005.
Kreyszig, E., "Advanced Engineering Mathematics," Eight Edition, John Wiley & Sons, Inc., 1999 pp. 942-952.

* cited by examiner

*Primary Examiner* — Bernarr Gregory
(74) *Attorney, Agent, or Firm* — Howard IP Law Group, PC (57) ABSTRACT

A method for guiding a multistage interceptor missile toward a target missile that may transition from a boost mode to a ballistic mode during the engagement. The method comprises the steps of tracking the position of the target missile with a sensor, generating a predicted intercept point and time, and loading the predicted intercept point and time into the interceptor missile guidance system. The interceptor missile is launched and transition is made to the second stage of propulsion of the interceptor missile. Second-stage midcourse guidance acceleration commands are generated in response to an elevated predicted intercept point generated using the Runge-Kutta integration method working on predicted target missile position, velocity, and acceleration. During third stage propulsion said interceptor missile is guided toward an updated predicted intercept point of the target missile. During fourth stage, the kinetic warhead effects a hit-to-kill intercept of the target missile.

18 Claims, 8 Drawing Sheets

GENERALIZED MIDCOURSE MISSILE GUIDANCE

STATEMENT OF GOVERNMENT INTEREST

This invention was made with government support under Contract/Grant Aegis BMD N00024-03-C-6110. The United States Government has certain rights in this invention.

BACKGROUND OF THE INVENTION

The Missile Defense Agency (MDA) is tasked to develop an integrated, layered Ballistic Missile Defense System (BMDS) to defend the United States, its deployed forces, allies, and friends from ballistic missile attack. The MDA BMDS strategy covers all phases of target ballistic missile flight, including boost, midcourse, and terminal. The current Aegis BMD supports the MDA goal by providing hit-to-kill interceptor missile engagement capability against target ballistic missiles in the midcourse phase. Fielded capability of the current Aegis BMD does not launch against or intercept target missiles while in their boost phase.

When launching an interceptor missile, such as the four-stage Standard Missile 3 (SM-3) from an Aegis firing ship against a hostile missile, the first stage is launched in the direction of the predicted intercept point of the target missile. The second stage is guided using midcourse guidance to a waypoint, which defines the end of the second stage of guidance, and is consistent with an updated predicted intercept point calculated by the Aegis Weapon System (AWS), assuming a ballistic target trajectory (target missile is under the influence of only gravitational forces). The third stage is guided to the updated predicted intercept point using inertial guidance performed by the interceptor missile. Terminal guidance of the SM-3 interceptor missile is performed by the fourth stage kinetic warhead using a modified version of proportional navigation to effect a hit-to-kill intercept of the target missile.

The current second-stage midcourse guidance may not be fully effective against a boosting target missile, and improved midcourse guidance is desired which is generalized in the sense that engagements of both boosting and ballistic target missiles are facilitated.

SUMMARY OF THE INVENTION

A method according to an aspect of the invention is for guiding a multistage interceptor missile toward a target missile, where the target missile may transition from a boost mode to a ballistic mode during the engagement. The method comprises the steps of tracking the position of the target missile with a sensor to determine its location, generating a pre-interceptor-missile-launch predicted intercept point and predicted intercept time, and loading the predicted intercept point (PIP) and time into the interceptor missile guidance system. The interceptor missile is launched, and the first-stage guidance is controlled at least in response to the target missile bearing and elevation toward the predicted intercept point. A transition is made to the second stage of propulsion of the interceptor missile. Second-stage midcourse guidance of the interceptor missile is controlled in response to second-stage midcourse guidance acceleration commands, which may be generated by the firing Aegis ship. Second-stage midcourse guidance acceleration commands are generated in response to an elevated predicted intercept point. The elevated predicted intercept point is generated by adjusting a predicted intercept point to account for the effects of interceptor missile velocity at waypoint, interceptor missile propulsion beyond second stage, and gravity between the waypoint and the PIP. The predicted intercept point is generated using the Runge-Kutta integration method working on predicted target missile position, velocity, and acceleration. A transition is made to third-stage propulsion of the interceptor missile, and the interceptor missile is guided toward an updated predicted intercept point of the target missile. A transition is made to the fourth stage kinetic warhead to effect a hit-to-kill intercept of the target missile.

In a particular mode of the method, the step of generating the generalized midcourse guidance acceleration commands in response to an elevated predicted intercept point generated using the Runge-Kutta integration method includes the steps of:

initializing a second-stage midcourse guidance algorithm with at least the pre-interceptor-missile-launch predicted intercept point (PIP), predicted intercept time, and waypoint;

generating the elevated predicted intercept point by calculating the current estimate of target missile position and velocity at the PIP using the Runge-Kutta integration technique which uses the current and future predictions of the target missile position, velocity, and acceleration including target missile boost acceleration, and then creating the elevated predicted intercept point by adjusting the PIP to account for the effects of interceptor missile velocity at waypoint, interceptor missile propulsion beyond second stage, and gravity between the waypoint and the PIP;

generating and updating an intercept triangle by calculating the desired direction of the interceptor missile's velocity vector at the waypoint, the time until the PIP, and the elevated PIP, using the average remaining interceptor missile velocity (VMAR) from the waypoint to the PIP, and constructing the intercept triangle with the three vertices defined by the waypoint position of the interceptor missile, the elevated linear target missile position, and the elevated PIP, where the elevated linear target missile position is calculated by taking the product of predicted target missile velocity at PIP and estimated time until PIP, and then subtracting that product from the elevated PIP;

calculating an updated average remaining missile velocity (VMAR) from the missile's waypoint position to the elevated PIP, in the time interval between the waypoint and PIP;

calculating the second-stage acceleration commands using an appropriate guidance law such as the vector gravity-optimized orthogonal navigation algorithm, which calculates interceptor missile acceleration commands that cause the interceptor missile to fly through the prescribed waypoint position with its relative velocity vector pointing in the prescribed direction, as determined by generalized midcourse guidance (GMCG) system.

This mode of the method also includes, following the step of generating the initial second-stage acceleration commands, iteratively repeating the steps of:

generating the elevated predicted intercept point by calculating the current estimate of target missile position and velocity at the PIP using the Runge-Kutta integration technique which uses the current and future predictions of the target missile position, velocity, and acceleration including target missile boost acceleration, and then creating the elevated predicted intercept point by adjusting the PIP to account for the effects of interceptor missile velocity at waypoint, interceptor missile propulsion beyond second stage, and gravity between the waypoint and the PIP;

generating and updating an intercept triangle by calculating the desired direction of the interceptor missile's velocity vector at the waypoint, the time until the PIP, and the elevated PIP, using the average remaining interceptor missile velocity (VMAR) from the waypoint to the PIP, and constructing the intercept triangle with the three vertices defined by the waypoint position of the interceptor missile, the elevated linear target missile position, and the elevated PIP, where the elevated linear target missile position is calculated by taking the product of predicted target missile velocity at PIP and estimated time until PIP, and then subtracting that product from the elevated PIP;

calculating an updated average remaining missile velocity (VMAR) from the missile's waypoint position to the elevated PIP, in the time interval between the waypoint and PIP;

calculating the second-stage acceleration commands using an appropriate guidance law such as the vector gravity-optimized orthogonal navigation algorithm, which calculates interceptor missile acceleration commands that cause the interceptor missile to fly through the prescribed waypoint position with its relative velocity vector pointing in the prescribed direction, as determined by generalized midcourse guidance (GMCG) system.

In this mode of the method, each successive iteration through the GMCG guidance loop may use the updated parameters from the previous iteration.

DESCRIPTION OF THE INVENTION

Boost-phase missile defense is described in U.S. patent application Ser. No. 11/430,644 filed May 9, 2006 in the name of Pedersen, and U.S. Pat. Nos. 7,394,047; 7,473,876; and 7,511,252 to Pedersen. As described in these references, defenses against ballistic missiles are currently concentrating upon the boost phase of the ballistic missile, which is a phase at which multiple warheads and/or countermeasures have not as yet been deployed. Intercepting a ballistic missile before it can deploy complicated countermeasures and/or multiple warheads greatly decreases the burden on sensors to distinguish lethal payload object(s) from countermeasures. Boost-phase launches involve having interceptor assets at a location or locations near the expected launch sites of threatening offensive ballistic missiles, sensing the presence of the threat missile soon after launch, calculating its expected trajectory, timely launching interceptor asset(s) to intercept the threat missile, and guiding the interceptor missile to its target. It will be understood that initially, a defender sensing the launch of a ballistic missile does not know exactly when it was launched, the type of missile which has been launched (although there may be some knowledge of the missile types available at the launch site), its mass, thrust, and intended trajectory. In fact, very little is initially known. Unlike engagements of threat missiles in their mid-course phase, where the trajectory of such threat missiles is well defined by Keplerian orbits, uncertainty in the trajectory of a boosting missile is a major challenge in defeating such a threat missile.

Launching against threat missiles in their boost phase requires methods to filter sensor measurements and establish track states, to determine the type of a threat missile, to propagate the threat missile's state into the future, to plan an engagement against the threat missile, and to guide an interceptor to destroy the threat missile. An engagement planner for boost phase interceptor launches must weigh the capability of the interceptor against the uncertainty in the trajectory of the boosting threat missile.

The problem of defense against a boosting threat missile is further exacerbated by the lack of knowledge of the threat missile's trajectory, as one can only plan an interceptor missile launch if one knows which interceptor missile, among several, is in a position from which, and has capabilities such that, it can be expected to make a successful interception. When generalized midcourse guidance according to an aspect of the invention is used for the second stage guidance together with the current $3^{rd}$ and $4^{th}$ stage guidance of the SM-3, the SM-3 may be launched against a boosting target missile and can be expected to intercept that missile in its ballistic phase.

Figure 1:
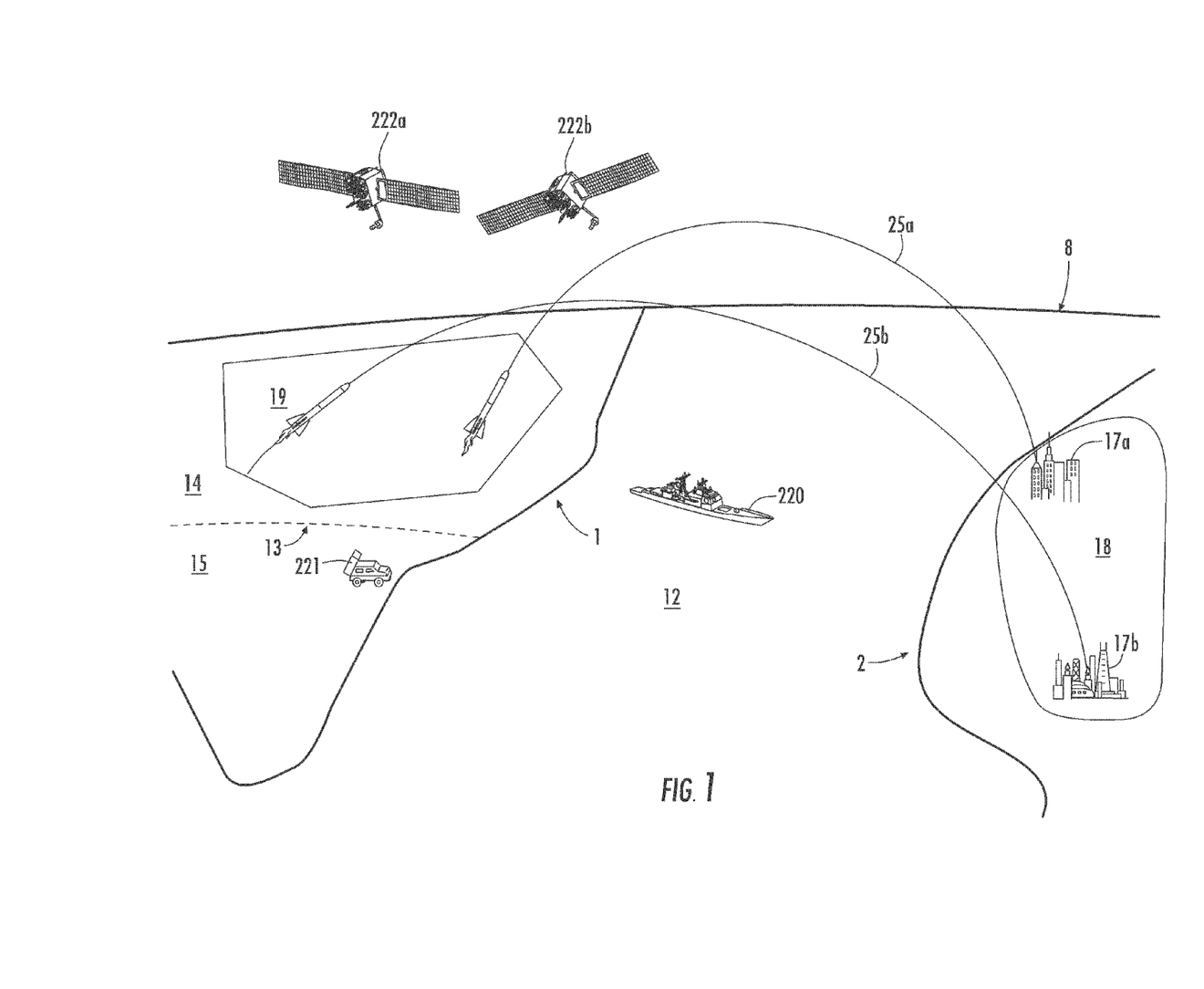
FIG. 1 is a simplified diagram illustrating a scenario in which a ballistic target missile is launched and takes a trajectory, and sensors detect the launch and provide boost phase fire control track sensor data for estimating the future location of the threat missile, planning the engagement of the threat missile, and for controlling an interceptor missile.

FIG. 1 is a simplified representation of the ballistic missile defense (BMD) problem, showing a region of water between two land masses, and also showing a defended area and locations from which attacking missiles can or might be launched. The physical problem can be understood by reference to FIG. 1, showing a portion of the Earth's surface and the horizon 8. In FIG. 1, a sea region 12 lies between two land masses 1 and 2. Land mass 1 is a peninsula including both enemy territory 14 and friendly territory 15 separated by a border 13, and land mass 2 includes friendly cities 17a and 17b. A defended region is designated 18. The operating region for sea-based defensive platforms lies in sea area 12. The operating region for land-based defensive assets lies in friendly territory 15 sufficiently close to the expected launch sites of the enemy missiles to launch interceptor missiles against the enemy missiles in their boost phase. A land-based sensor and interceptor missile launcher is illustrated as 221. The adversary is expected to launch ballistic missiles, if at all, from the launch area designated 19. The enemy missiles, when launched, fly along trajectories, designated generally as 25a and 25b, toward the set of defended cities 17a and 17b. A set of assets is assigned the mission to protect these defended areas. Each asset type (e.g., land based, sea based, space based) is constrained to operate within some pre-specified region. These regions, known as operating areas, satisfy several operational constraints. For land-based systems, the sensors and interceptors must be located on suitable terrain, away from enemy territory. Sea-based sensors and interceptors are located away from commercial shipping lanes and littoral areas controlled by the adversary. Space based assets, such as sensor satellites 222a and 222b, are constrained to specific orbits.

Figure 2:
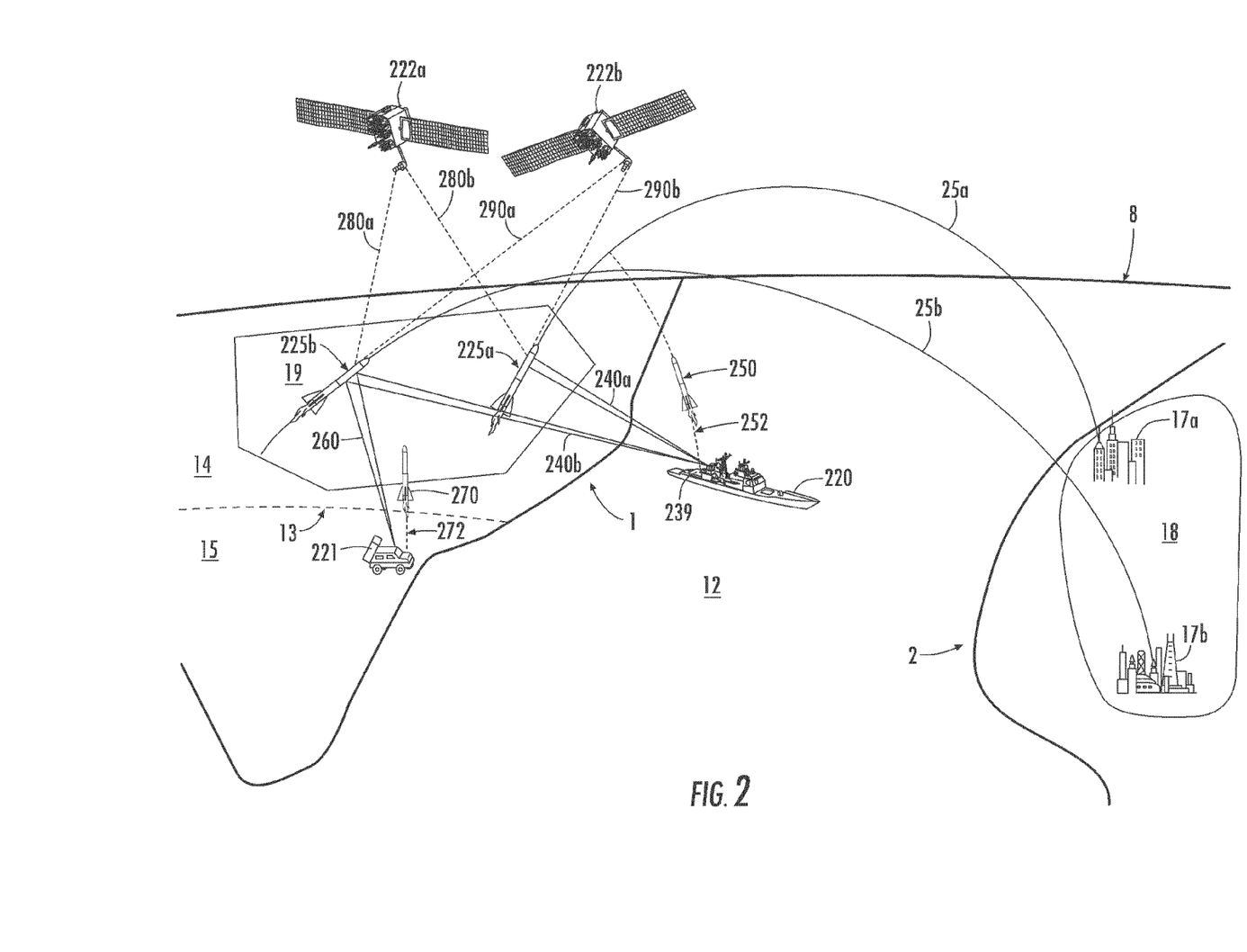
FIG. 2 is a simplified diagram illustrating a scenario similar to that of FIG. 1, showing how defensive assets are used.

FIG. 2 illustrates the same region as FIG. 1, and corresponding elements are designated by like alphanumerics. In this case, three types of defensive assets, namely ship 220, land-based interceptor launcher 221, and spacecraft 222a and 222b, are participating in an engagement against two threat missiles 225a and 225b traveling along trajectories 25a and 25b, respectively. The sea based asset 220 has a sensor arrangement 239 which is capable of "deploying" surveillance volumes 240a and 240b, and is also capable of launching one or more intercepting missiles 250 along paths, one of which is illustrated as a dash line 252, for attempting to destroy ballistic missile threat 225a or 225b. Of course, if there are plural threat missiles, plural interceptors are expected to be launched. More than one interceptor may be launched to improve the chances of destroying a particular missile, if desired. The land based asset 221 has a sensor arrangement which is capable of "deploying" a surveillance volume 260, and is also capable of launching an intercepting missile 270 along path 272 for destroying ballistic missile threats. The space based assets have sensor arrangements capable of sensing ballistic missile threats within regions subtended by dotted lines 280a:280b, and 290a:290b, respectively. The land asset 221, sea asset 220, and space assets 222a, 222b have the capability of relaying information to each other. The information links are illustrated by "lightning bolt" symbols 295a, 295b, and 295c. The links could include any form of real or near-real-time communication between assets. Communication links are shown directly between assets to illustrate that information is conveyed from one asset to another, however communications do not have to be directly between assets but could use intermediary ground, air, or space-based assets.

Figure 3A:
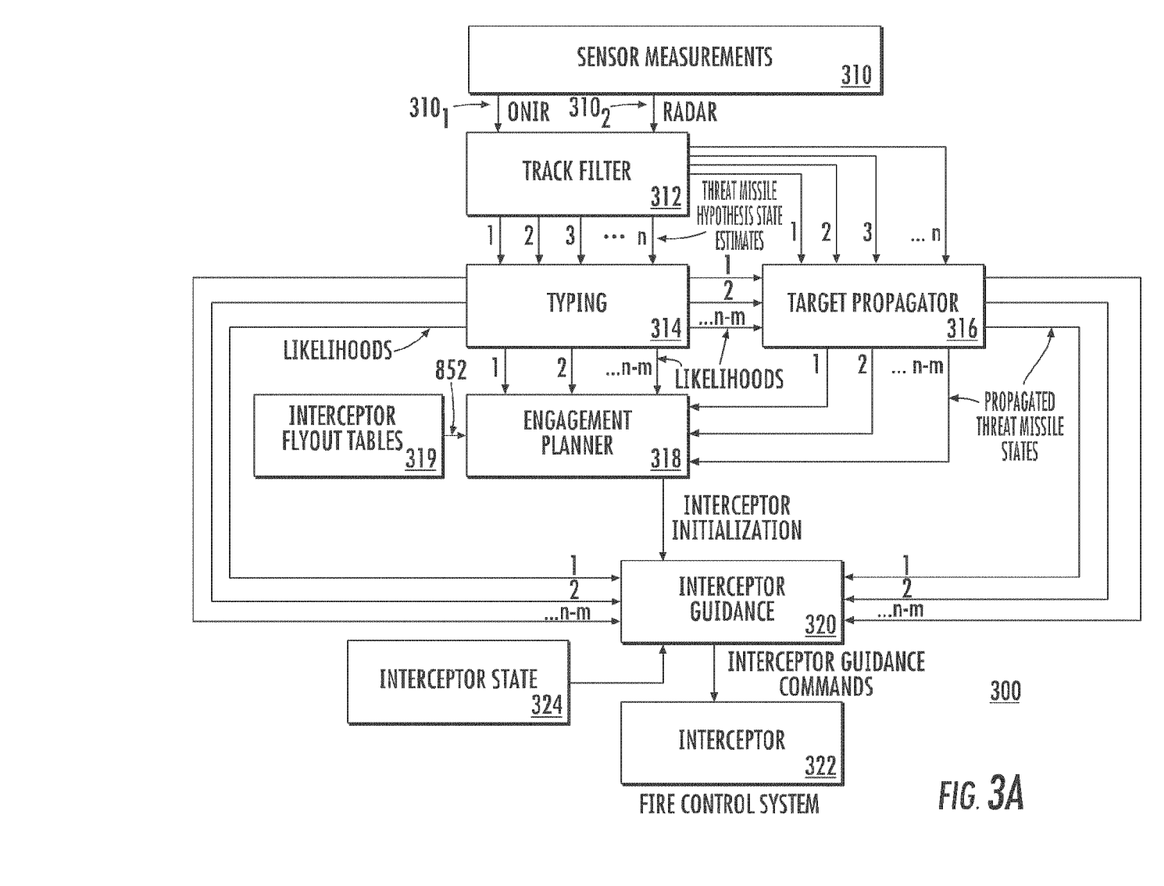
FIG. 3A is a simplified block diagram of a fire control system architecture.

FIG. 3A is a simplified logic flow diagram or chart illustrating the overall architecture or operation 300 of a fire control system according the '644 patent application. In general, the fire control system 300 of FIG. 3A considers multiple hypotheses including a set of target hypotheses including n possible threat missile/stage combinations that might be encountered, where n is an integer number greater than zero. For each type of target that might be encountered there are as many hypotheses as the target has stages. That is, the system considers all the threat missile types which might be launched, and all permutations of the trajectory that may be observed. A multi-hypothesis track filter generates state estimates for the n possible threat missile/stage combinations (or hypotheses) based on a priori information about potential threat missiles as well as sensor measurements. In one version, the multiple hypotheses track filter may be such as that described in a U.S. Pat. No. 7,026,890, issued Apr. 11, 2006 in the name of Boka et al., and entitled "Missile Identification and Tracking System and Method," which combines a priori knowledge of the characteristics of various possible types of threat missiles with the track data from the sensors, to establish separate estimates of the target hypotheses' states (position, velocity, and specific mass flow rate) for each stage of each threat hypothesis. This combined information tends to improve the estimate of the target missile states. The track filter state estimates are made available to a typing processor or algorithm. The typing process may include a matched filter scheme as described as part of the '890 patent, andor any algorithm that uses metrics to determine the likelihood of each hypothesis being correct. These likelihoods should sum to one or unity. The track filter states and the typing likelihoods are made available to a multihypothesis target state propagator. The multihypothesis target state propagator propagates into the future all those threat hypotheses' states whose likelihoods exceed a predetermined or set threshold. It should be emphasized that states are propagated, not likelihoods. Significant computational resources are conserved by not propagating those states associated with hypotheses having low likelihoods. The propagated multihypothesis target states and the typing likelihoods are made available to an engagement planner, which determines the optimal way to engage the threat missile. The engagement planner also receives information about the capability of available interceptors and their location(s) relative to any threat missiles. The engagement planner also ignores hypotheses with likelihoods below a set threshold, for additional computation resource conservation. A selected interceptor is initiated, launched, and guided to the target using a boost phase guidance algorithm. The boost phase guidance algorithm uses the propagated hypothesis positions and likelihoods to estimate the location of the target at intercept. During guidance, a composite track is formed or defined that represents the weighted-average position of the hypothesis. The weighted average is a function of each threat hypothesis' position and its associated likelihood.

The operation of the logic 300 of FIG. 3A begins with the sensing of a boost phase ballistic missile soon after launch. Sensing immediately at launch is not possible with a surface-based sensor because the curvature of the Earth prevents it from observing the actual launch. The delay between launch and first sensing depends upon the acceleration of the missile, the immediate topology around the launch site and the sensing location, and the distance between the launch site and the sensor location, but may be about 25 seconds or more. An Overhead Non-imaging Infrared (ONIR) sensor, on the other hand, can produce results instantaneously or with only a short delay depending on cloud cover at the launch site. The sensor measurements are represented in FIG. 3A by a block 310, which produces ONIR sensor signals at an ONIR output port $310_1$, andor radar measurements at a RADAR output port $310_2$. The sensor signals, from whatever source, are applied from ports $310_1$ and $310_2$ to a block 312, which represents a multihypothesis track filter. The multihypothesis track filter 312 combines a priori knowledge of the characteristics of various possible types of threat missiles with the track data from the sensors, to establish separate estimates of the target hypotheses' states (at least position and velocity) for n possible hypotheses. A multihypothesis track filter maintains separate filters for each hypothesis and uses a priori information about each hypothesis to improve the state estimates for each hypothesis over (by comparison with) a filter that uses no a priori information. One implementation of a multihypothesis filter is U.S. Pat. No. 7,026,980 to Boka et al., entitled "Missile Identification and Tracking System and Method." The separate estimates consisting of n possible threat/stage hypotheses appear at output ports 1, 2, 3, . . . , n of the track filter 312, and are made available to a typing processor represented as a block 314 and to a target propagator represented as a block 316. Typing algorithm or block 314 uses multiple metrics to determine the likelihood that each hypothesis is correct. These likelihoods sum to unity or one, and this summing characteristic is later used to generate weighting factors for each threat hypothesis.

The track filter states from track filter block 312 of FIG. 3A and the likelihoods from typing block 314 are applied to a multihypothesis target propagator block 316. Target propagator block 316 propagates into the future all those threat hypotheses having likelihoods above a threshold level. In one version of the target propagator, the threshold level is fixed.

As illustrated in FIG. 3A, target propagator block 316 produces n-m propagated threat states, where m is the number of hypotheses with likelihoods falling below the threshold. Significant computational resource savings arise from not propagating the low-likelihood threat states. Early in an engagement little track data is available from which the track filter can produce estimated track states, so there is little information on which to base the discarding of hypotheses, so most or all hypotheses are propagated. As more data becomes available from the sensors the typing block 314 is expected to be able to discount certain hypotheses and to assign low probabilities to other hypotheses.

The propagated multihypothesis threat states from target propagator block 316 of FIG. 3A are applied to an engagement planner illustrated as a block 318 together with the likelihood information from typing block 314. Engagement planner 318 also receives interceptor missile flyout data or tables from a block illustrated as 319. Engagement planner 318 uses a subset of the hypotheses to determine an optimal way to engage the target. In order to conserve computational resources, the engagement planner 318 ignores those hypotheses having likelihoods below the threshold. The optimal engagement information is coupled from block 318 to initialize an interceptor guidance processing illustrated as a block 320.

Interceptor guidance block 320 of FIG. 3A receives optimal engagement information from block 318, propagated threat missile states from target propagator block 316, likelihood information from block 314, and interceptor state information from a block 324. The interceptor state information contains information describing the state of the interceptor (such as position, velocity, and acceleration) at the time that the interceptor guidance function block 320 is entered from block 324. Interceptor guidance block 320 estimates the location of the target at the time of intercept in order to compute interceptor guidance commands. Launch and intercept guidance commands are applied from interceptor guidance block 320 to the interceptor 322. During the course of an engagement, the target state and hypothesis likelihoods are updated as more information becomes available. The track filter 312, the target propagator 316, the engagement planner 318, and the interceptor guidance 320 all take advantage of the new data to refine their solutions.

Figure 3B:
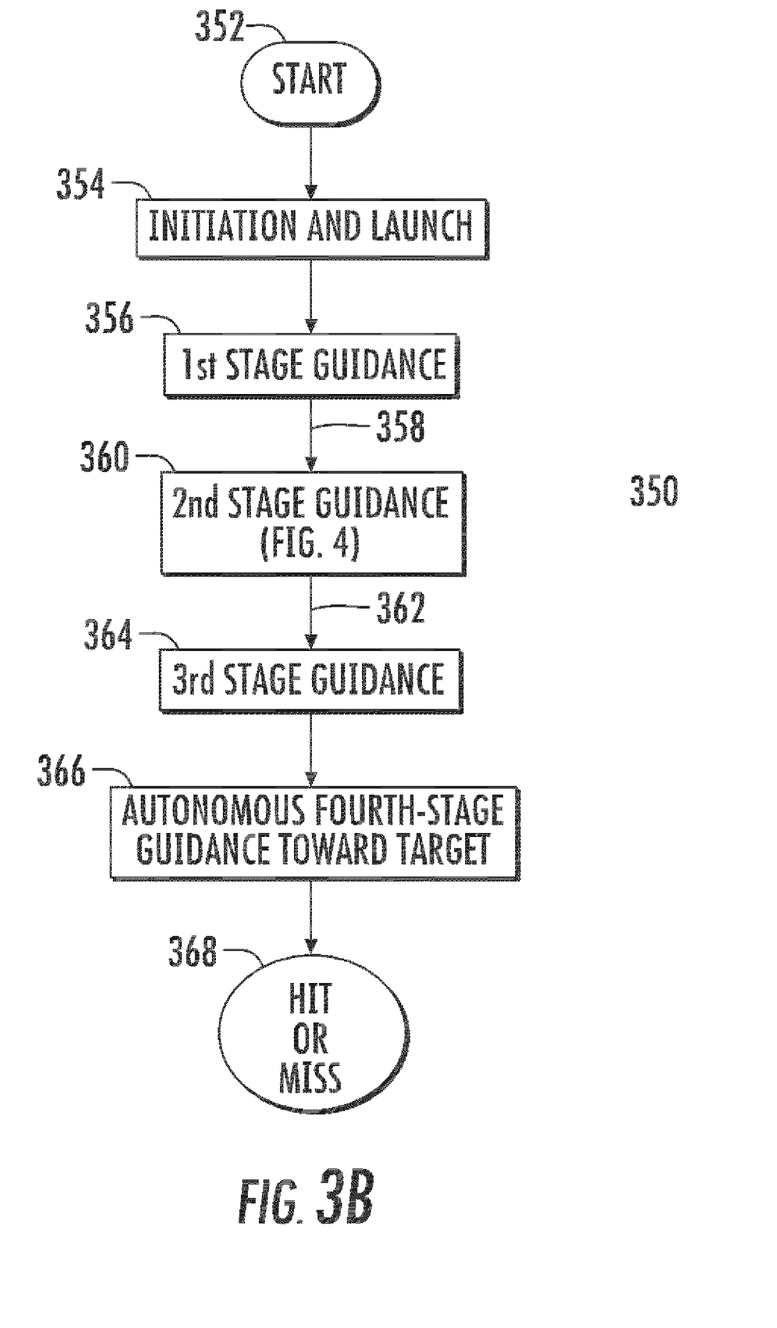
FIG. 3B is a simplified block diagram of the guidance stages for the four-stage SM-3 interceptor missile.

Interceptor guidance block 320 of FIG. 3A receives interceptor initialization information from engagement planner block 318, propagated threat missile states for n-m hypotheses from target propagator 316, and typing information for the n-m hypotheses from typing block 314. FIG. 3B illustrates the logic or control flow 350 of guidance stages for the four-stage SM-3 interceptor missile. The processing for this control takes place partially in the interceptor guidance block 320 of FIG. 3A, and partially in the interceptor missile itself. It will be understood that interceptor guidance block 320 may be at a single location or it may be distributed among a plurality of locations or assets. In FIG. 3B, the control begins with a START block 352, and flows to a block 354. Block 354 represents initialization and launch of the interceptor missile. Block 356 represents first-stage guidance, which may include simply a launch in the general direction of the target missile. The first-stage guidance is controlled in accordance with prior-art techniques, and further generally includes the interceptor missile initially launching straight up, then tilting a prescribed angle away from the ship toward the predicted intercept point (PIP). At the end of the first-stage guidance, the control of logic 350 of FIG. 3B flows from first-stage guidance block 356 by way of a transition or path 358 to a block 360, which represents the second stage guidance.

Figure 4:
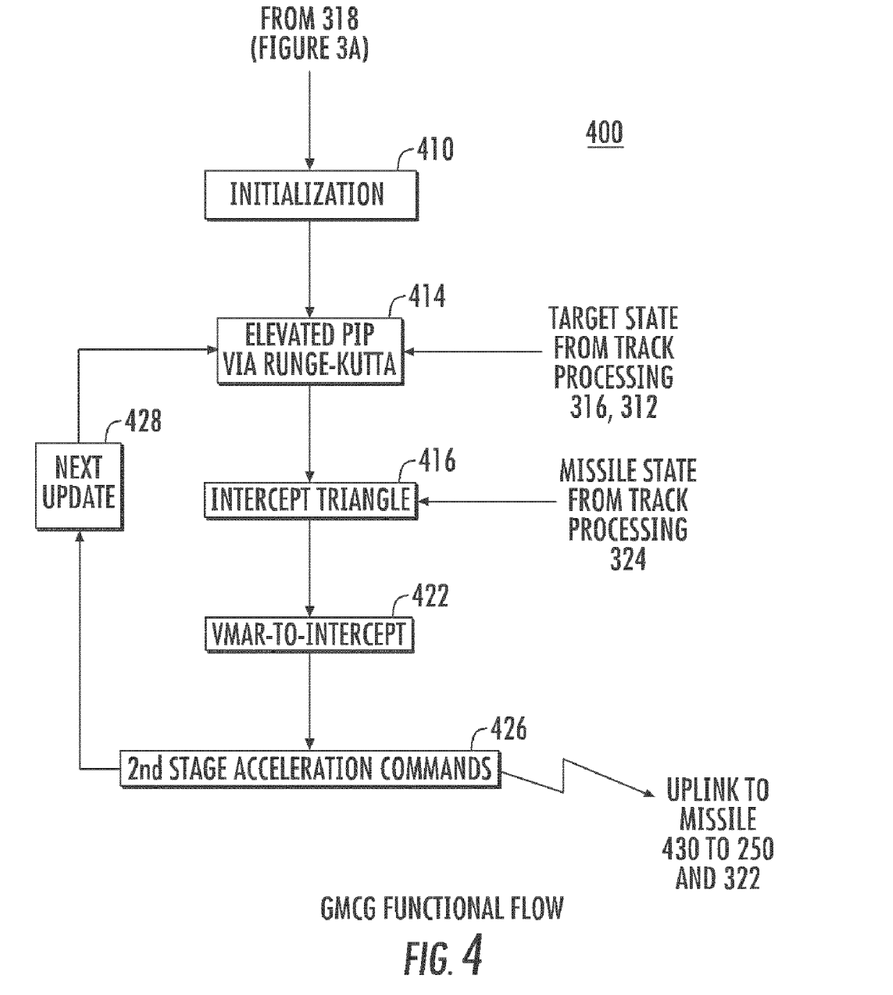
FIG. 4 is a simplified block diagram of the Generalized Midcourse Guidance (GMCG) System.

Details of the second stage guidance are illustrated by the logic of FIG. 4, and incorporates aspects of the invention. When the second stage of propulsion and guidance represented by block 360 is complete, the logic 350 of FIG. 3B flows by way of a logic path 362 to blocks 364 and 366. Blocks 364 and 366 represent third and fourth-stage guidance, respectively, of the SM-3 as known in the art. The third stage is guided to the updated predicted intercept point using inertial guidance performed by the interceptor missile. Terminal guidance of the SM-3 interceptor missile is performed by the fourth stage kinetic warhead using a modified version of proportional navigation to effect a hit-to-kill intercept of the target missile. The logic 350 ends following block 366 when the interceptor missile either hits the target or misses, as suggested by block 368.

A method according to an aspect of the invention is for guiding a multistage interceptor missile toward a target missile, where the target missile may transition from a boost mode to a ballistic mode during the engagement. The method comprises the steps of tracking the position of the target missile with a sensor to determine its location, generating a pre-interceptor-missile-launch predicted intercept point and predicted intercept time, and loading the predicted intercept point (PIP) and time into the interceptor missile guidance system. The interceptor missile is launched, and the first-stage guidance 356 of FIG. 3B is controlled at least in response to the target missile bearing and elevation towards the predicted intercept point. A transition is made along path 358 to the second stage of propulsion of the interceptor missile, as represented by block 360. Second-stage midcourse guidance of the interceptor missile is controlled in response to second-stage midcourse guidance acceleration commands generated by the processing of block 320 of FIG. 3A, which as mentioned may be at any location, including on the firing Aegis ship. Second-stage midcourse guidance acceleration commands are generated in response to an elevated predicted intercept point. The elevated predicted intercept point is generated by adjusting a predicted intercept point (PIP) to account for the effects of interceptor missile velocity at waypoint, interceptor missile propulsion beyond second stage, and gravity between the waypoint and the PIP. The PIP is generated using the Runge-Kutta integration method working on predicted target missile position, velocity, and acceleration. A transition is made by path 362 of FIG. 3B to third-stage propulsion of the intercept missile (block 364), and the interceptor missile 250 of FIG. 2 is guided toward an updated predicted intercept point of the target missile. A transition is made to control 366 of the fourth stage kinetic warhead to effect a hit-to-kill intercept of the target missile.

FIG. 4 is a simplified logic flow chart illustrating Generalized Midcourse Guidance (GMCG) System processing associated with Interceptor Guidance block 320 of FIG. 3A and second-stage guidance block 360 of FIG. 3B. In a particular mode of the method, the generalized midcourse guidance acceleration commands are generated in response to an elevated predicted intercept point generated using the Runge-Kutta integration method. As shown in the logic 400 of FIG. 4, this mode of the method includes the following steps:

(i) The logic 400 of FIG. 4 starts with the Initialization block 410. Block 410 initializes the $2^{nd}$ stage guidance using at least information related to the pre-interceptor-missile-launch predicted intercept point (PIP), predicted intercept time, and waypoint, which are outputs from the engagement planner block 318 described in conjunction with FIG. 3A. The steps of estimating an initial PIP, estimating an initial predicted intercept time, and choosing a waypoint are known in the art.

(ii) The Initialization block 410 then flows into the Elevated PIP via Runge-Kutta block 414. Block 414 generates the elevated predicted intercept point by calculating the current estimate of target missile position and velocity at the predicted intercept point (PIP) using the Runge-Kutta integration technique, which uses the current and future predictions of the target missile position, velocity, and acceleration including target missile boost acceleration, and then calculating the elevated predicted intercept point by adjusting the PIP to account for the effects of interceptor missile velocity at waypoint, interceptor missile propulsion beyond second stage, and gravity between the waypoint and the PIP. The Runge-Kutta calculations used to generate a PIP and the additional calculations used to calculate an elevated PIP in block 414 of FIG. 4 are discussed in conjunction with FIG. 5.

(iii) The Elevated PIP via Runge-Kutta block 414 then flows into the Intercept Triangle block 416. It should be understood that while the invention involves aspects of second-stage guidance of the interceptor missile, the purpose of the second-stage guidance is ultimately for hitting the target. Hitting the target requires second-stage guidance which depends upon conditions occurring after the second stage of guidance, as predicted to occur prior to and during the second stage of operation. Thus, second-stage guidance depends upon predicted performance of the later stages of propulsion of the interceptor missile. Block 416 generates and updates an intercept triangle by calculating the desired direction of the interceptor missile's velocity vector at the waypoint, the time until the PIP, and the elevated PIP, using the average remaining interceptor missile velocity (VMAR) from the waypoint to the PIP, and constructing an intercept triangle with the three vertices defined by the waypoint position of the interceptor missile, the elevated linear target missile position, and the elevated PIP, where the elevated linear target missile position is calculated by taking the product of predicted target missile velocity at PIP and estimated time until PIP, and then subtracting that product from the elevated PIP. The processes and calculations related to Intercept Triangle block 416 of FIG. 4 are discussed in conjunction with FIG. 6 and FIG. 7.

(iv) The Intercept Triangle block 416 then flows into the VMAR-to-Intercept block 422. Block 422 calculates an updated average remaining missile velocity (VMAR). This velocity is from the missile's waypoint position to the updated elevated PIP, in the time interval between the waypoint and the PIP.

(v) The VMAR-to-Intercept block 422 then flows into the 2$^{nd}$ Stage Acceleration Commands block 426. Block 426 calculates the second-stage generalized midcourse guidance acceleration commands that will guide the interceptor missile to achieve the desired direction of the interceptor missile's velocity vector at the waypoint, as calculated in block 416 of FIG. 4. The acceleration commands are calculated using an appropriate guidance law such as the vector gravity-optimized orthogonal navigation algorithm, which calculates interceptor missile acceleration commands that cause the interceptor missile to fly through the prescribed waypoint position with its relative velocity vector pointing in the prescribed direction, as determined by the generalized midcourse guidance (GMCG) system. Guidance laws, such as the vector gravity-optimized orthogonal navigation algorithm, are known in the art.

As shown in FIG. 4, the 2$^{nd}$ Stage Acceleration Commands block 426 flows into the Next Update block 428. This mode of the method also includes, following the step of generating the initial second-stage GMCG acceleration commands, iteratively repeating the steps in blocks 414, 416, 422, and 426. Each successive iteration through the GMCG loop may use the updated parameters from the previous iteration.

Figure 5:
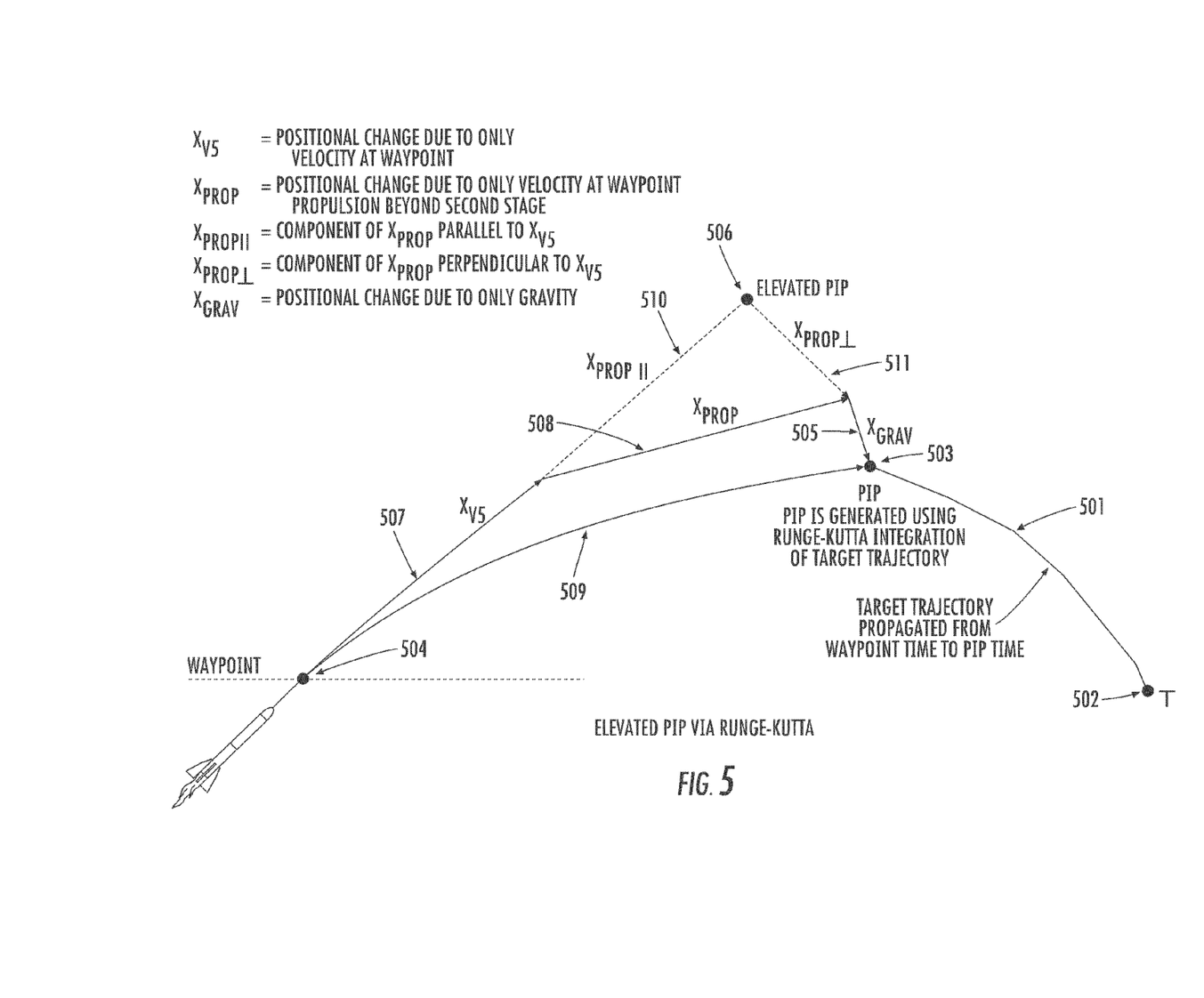
FIG. 5 is a simplified diagram of the Generalized Midcourse Guidance (GMCG) System elevated predicted intercept point geometry.

FIG. 5 shows the geometry used to generate the elevated PIP from block 414 in FIG. 4. The interceptor missile trajectory 509 and the target missile trajectory 501 are propagated from the current time to the time when the interceptor missile reaches the waypoint 504. The target trajectory 501 is propagated from its position T 502 at the waypoint time to a predicted intercept point (PIP) 503, which occurs at the end of the fourth-stage guidance. The target trajectory 501 is propagated using the Runge-Kutta integration technique, which uses the current and future predictions of the target missile position, velocity, and acceleration including target missile boost acceleration. The PIP 503 is adjusted, or elevated, to account for $X_{GRAV}$ 505 and $X_{prop\perp}$ 511. $X_{GRAV}$ 505 represents the effect of gravity on the interceptor missile position between the waypoint 504 and the PIP 503. $X_{prop\perp}$ 511 is the component of the interceptor missile propulsion beyond second stage $X_{prop}$ 508 that is perpendicular to the missile's positional change $X_{VS}$ 507 due to its velocity at the waypoint 504. $X_{prop\parallel}$ 510 is the component of the interceptor missile propulsion beyond second stage $X_{prop}$ 508 that is parallel to the missile's positional change $X_{VS}$ 507 due to its velocity at the waypoint 504. Accounting for the effects of $X_{GRAV}$ 505 and $X_{prop\perp}$ 511 on the PIP 503 results in the elevated PIP 506. By aiming the interceptor missile at the elevated PIP 506, the effects of interceptor missile velocity at waypoint 504, interceptor missile propulsion beyond second stage, and gravity between the waypoint 504 and the PIP 503 will cause the interceptor missile to be on a trajectory 509 to hit the target missile at the PIP 503. GMCG uses a nonlinear propagator known as the classical Runge-Kutta method of fourth order, or simply the Runge-Kutta method, to calculate the PIP 503 by propagating the position and velocity of the target from the current time to the predicted intercept time $T_{int}$. The Runge-Kutta propagator computes the solution of the initial value problem $y'=f(t,y)$, $y(t_0)=y_0$ at equidistant time steps $t_1=t_0+\Delta t$, $t_2=t_0+2\Delta t, \ldots, t_N=t_0+N\Delta t$. The number of time steps is chosen such that $t_0+N\Delta t$ is equal to the current prediction of intercept time $T_{int}$, or a truncated time $T_{int\_clipped}$ that is within $\Delta t$ of $T_{int}$. The number of time steps can be calculated as $$N = \left\lfloor \frac{T_{int} - t_0}{\Delta t} \right\rfloor,$$

where $\lfloor \ \rfloor$ denotes the floor function whose value is the largest integer less than or equal to the value of the expression contained within. Defining the position and velocity state vector as $$y \stackrel{def}{=} \begin{bmatrix} p \\ v \end{bmatrix},$$

the inputs to the algorithm are the following initial values: initial time $t_0$, position and velocity at initial time $y_0=[p_0\ v_0]'$, time step size $\Delta t$, and number of time steps N. The outputs are approximations of the target's position and velocity $y_{n+1}=$ $[p_{n+1} \ v_{n+1}]'$ to the solution $y(t_{n+1})$ at each time step $t_{n+1}=t_0+(n+1)\Delta t$, where $n=0, 1, \ldots, N-1$. The Runge-Kutta algorithm iterates as follows:

For $n = 0, 1, \ldots, N-1$ do:

$$k_1 = \Delta t * f(t_n, y_n)$$

$$k_2 = \Delta t * f\left(t_n + \frac{1}{2}\Delta t, y_n + \frac{1}{2}k_1\right)$$

$$k_3 = \Delta t * f\left(t_n + \frac{1}{2}\Delta t, y_n + \frac{1}{2}k_2\right)$$

$$k_4 = \Delta t * f(t_n + \Delta t, y_n + k_3)$$

$$t_{n+1} = t_n + \Delta t$$

$$y_{n+1} = y_n + \frac{1}{6}(k_1 + 2k_2 + 2k_3 + k_4)$$

End.

If the integration is truncated in the equation $$N = \left\lfloor \frac{T_{int} - t_0}{\Delta t} \right\rfloor,$$

an additional iteration is performed to propagate the state from $T_{int\_clipped}$ to $T_{int}$. The final output gives the target state $y_{int}=[p_{int} \ v_{int}]'$ at intercept, where $p_{int}$=PIP. The elevated PIP 506 is then calculated as Elevated PIP=PIP+$X_{GRAV}$+$X_{prop\perp}$. The propagation function $y'=f(t,y)$ is rewritten here as $$\frac{d}{dt}\begin{bmatrix} p \\ v \end{bmatrix} = \begin{bmatrix} v \\ a \end{bmatrix}.$$

The derivatives of position and velocity are used in equations for the Runge-Kutta algorithm iterations. For position p, the derivative is the given input velocity and does not need to be calculated. For velocity v, the derivative is calculated as the sum of the different acceleration components acting on the target, which can be written as $$\frac{d}{dt}v = a = -\frac{\mu Z}{\|Z\|^3} + a_{thrust} - \omega \times (\omega \times Z) - 2\omega \times v$$

where, $\mu$=earth gravitational constant, $Z=p+R$, R=position from center of earth to interceptor launch location, $\|\ \|$ denotes the norm of the vector contained within, $a_{thrust}$=target thrust acceleration, and $\omega$=angular velocity of the earth. The velocity derivative equation includes the effects of gravitational acceleration, target thrust acceleration, centripetal acceleration, and Coriolis acceleration. Estimates of the target's initial position, initial velocity, initial boost acceleration, and future boost accelerations may come from the boost phase target track filter block 312 of FIG. 3A, either directly or through a target propagator block 316 of FIG. 3A.

Figure 6:
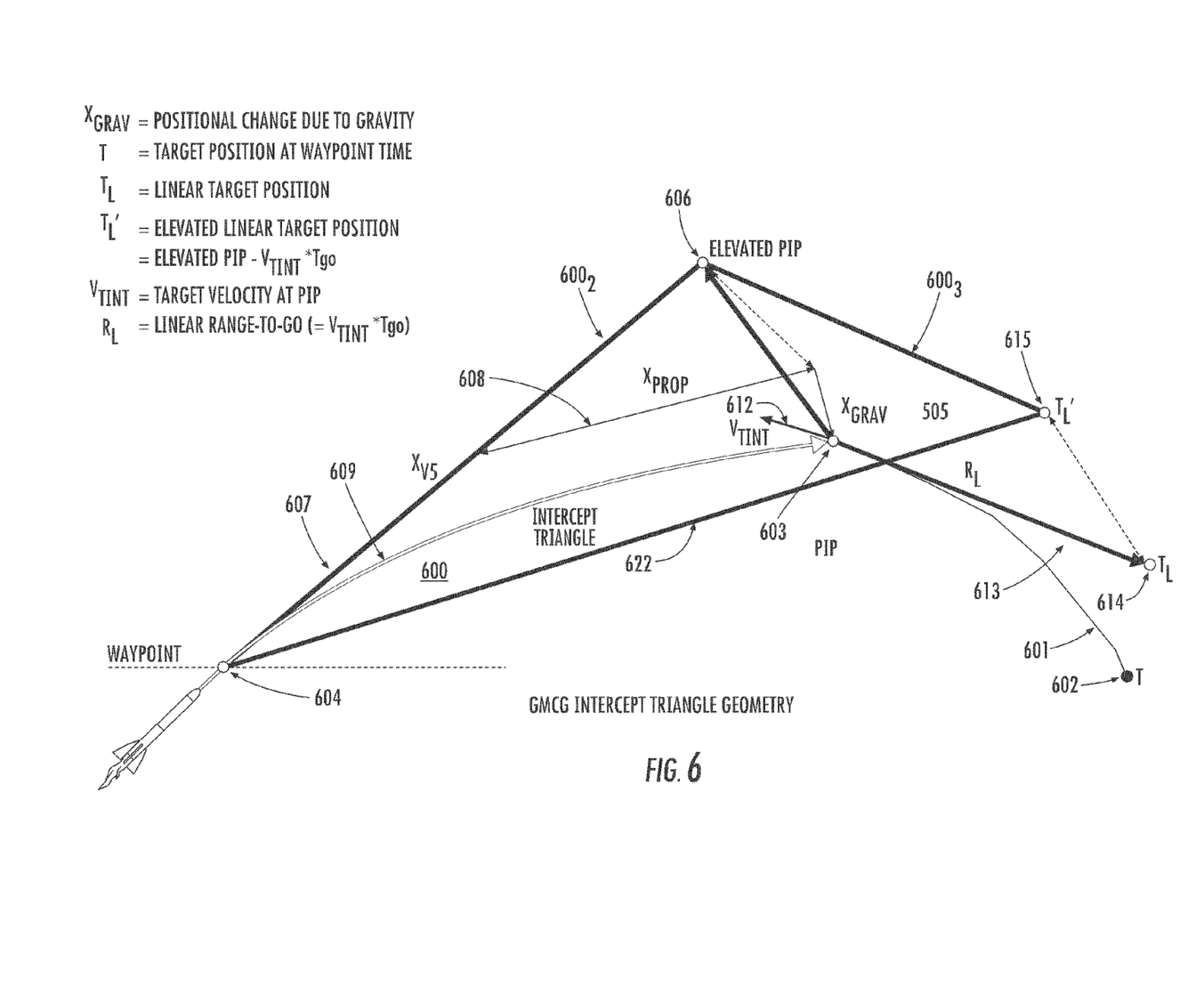
FIG. 6 is a simplified diagram of the Generalized Midcourse Guidance (GMCG) System intercept triangle geometry.

FIG. 6 shows the Generalized Midcourse Guidance (GMCG) Intercept Triangle geometry associated with the calculations of Intercept Triangle block 416 of FIG. 4. The intercept triangle 600 of FIG. 6 has vertices at the waypoint 604, at the elevated predicted intercept point (PIP) 606, and at the elevated linear target position $T_L'$ 615. The side of triangle 600 extending from waypoint 604 to elevated linear target position $T_L'$ 615 is designated 622, and represents the interceptor-to-target line-of-sight. The side of triangle 600 extending from waypoint 604 to elevated PIP 606 is designated 600$_2$, and the side extending from elevated linear target position $T_L'$ 615 to elevated PIP 606 is designated 600$_3$. The waypoint 604 is the position of the interceptor missile at the end of the second stage of guidance. The elevated PIP 606 of FIG. 6, as discussed in conjunction with elevated PIP 506 of FIG. 5, is the result of adjusting the PIP 603 to account for the effects of interceptor missile velocity at waypoint 604, interceptor missile propulsion beyond second stage, and gravity between the waypoint 604 and the PIP 603. Let arrow $V_{Tint}$ 612 of FIG. 6 represent the target velocity vector at the time $T_{int}$ of intercept ($V_{Tint}=v_{int}$ from the Runge-Kutta solution calculated in block 414 of FIG. 4), and let $T_{go}$ represent the time-to-go from the current time $T_{now}$ to the time of intercept $T_{int}$ (i.e., $T_{go}=T_{int}-T_{now}$). The linear target position $T_L$ 614 is defined by subtracting the linear range-to-go vector $R_L=V_{Tint}*T_{go}$ 613 from the PIP 603. Similarly, the elevated linear target position $T_L'$ 615 is defined by subtracting the linear range-to-go vector $R_L=V_{Tint}*T_{go}$ 613 from the elevated PIP 606. The target trajectory 601 and the target position T 602 at the waypoint time correspond to 501 and 502, respectively, of FIG. 5. The positional change $X_{V5}$ 607 in the interceptor due to the interceptor missile velocity at the waypoint and the interceptor missile trajectory 609 correspond to 507 and 509, respectively, of FIG. 5. The interceptor missile propulsion beyond second stage $X_{prop}$ 608 corresponds to 508 of FIG. 5. The Intercept Triangle 600 in FIG. 6 is updated, as described in conjunction with FIG. 7, in the Intercept Triangle block 416 of FIG. 4.

Figure 7:
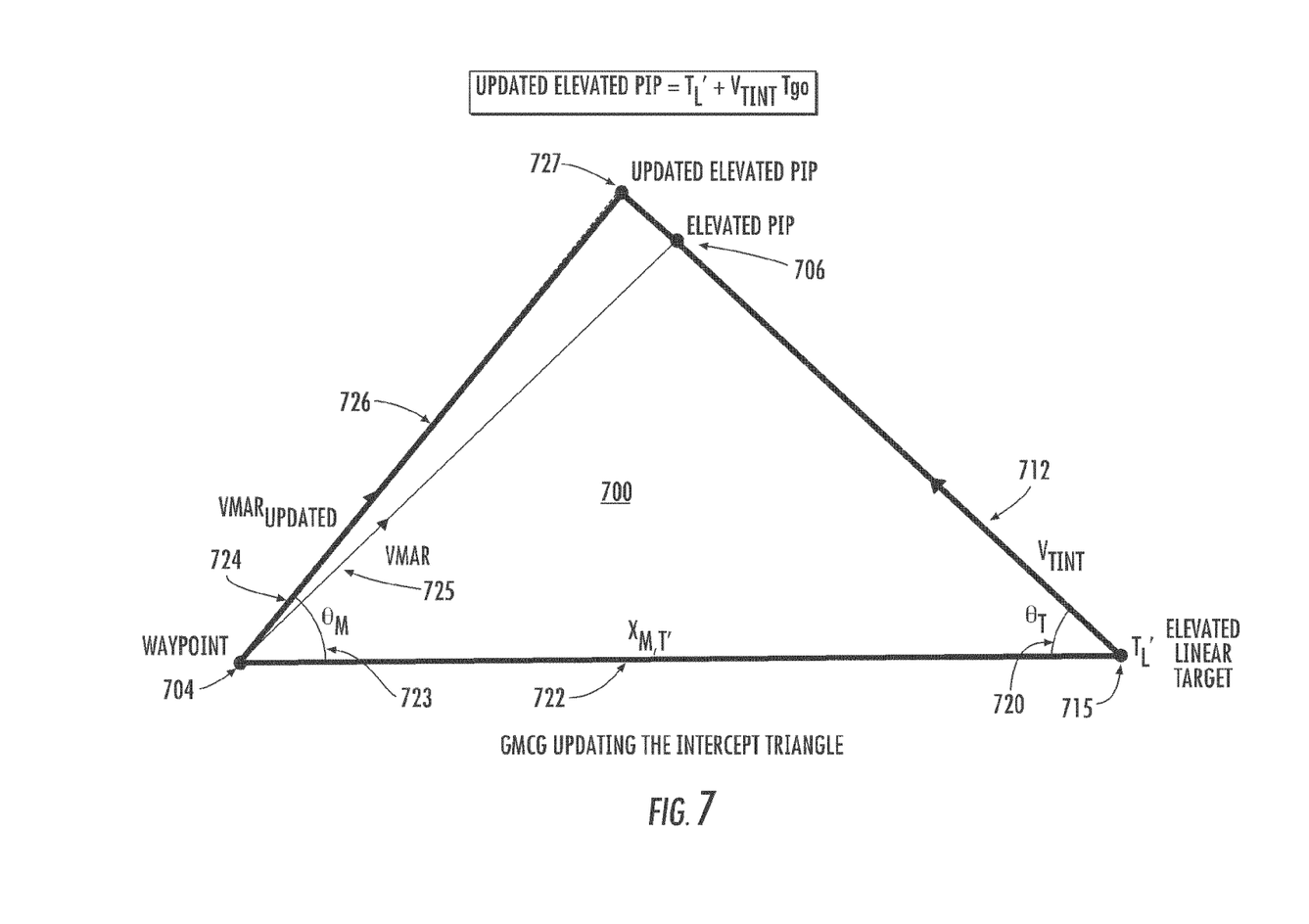
FIG. 7 is a simplified diagram of the updated Generalized Midcourse Guidance (GMCG) System intercept triangle.

FIG. 7 illustrates the geometry relating to the process performed in block 416 of FIG. 4 for updating the intercept triangle. The intercept triangle 700 of FIG. 7 corresponds to the intercept triangle 600 of FIG. 6. The intercept triangle 700 has vertices at the waypoint 704, at the elevated predicted intercept point (PIP) 706, and at the elevated linear target position $T_L'$ 715. On each iteration through the $2^{nd}$ stage guidance loop of logic 400 of FIG. 4, the intercept triangle of FIG. 7 is updated by performing the following sequence of computations, all performed in block 416:

Step 1: Compute $$\cos\theta_T = \frac{X_{M,T'} \cdot V_{Tint}}{\|X_{M,T'}\|\|V_{Tint}\|},$$

where $\theta_T$ is the angle 720 lying between the target velocity vector $V_{Tint}$ 712 at the time of intercept and the missile-to-target line-of-sight vector $X_{M,T'}$ 722. The target velocity vector $V_{Tint}$ at the time of intercept is illustrated in FIG. 7 as an arrow 712 extending from the elevated linear target position $T_L'$ 715 toward the elevated PIP 706. The interceptor-to-target line-of-sight vector $X_{M,T'}$ is illustrated as a line segment 722 extending between the waypoint 704 and the elevated linear target position $T_L'$ 715.

Step 2: Compute $$\sin\theta_M = \frac{\|V_{Tint}\|}{VMAR}\sin\theta_T,$$

where angle $\theta_M$ is the angle 723 between the line-of-sight vector $X_{M,T'}$ 722 and the desired interceptor missile heading 724, and where VMAR is the average remaining velocity of the missile along the vector 725 pointing from the waypoint 704 to the elevated PIP 706. The desired missile heading 724 will be the direction of VMAR$_{updated}$, which is the VMAR for the next iteration through the 2$^{nd}$ stage guidance loop.

Step 3: Compute the closing velocity $V_C$, the updated time-to-go $T_{go}$ between the current time and the PIP, and the updated intercept time $T_{int}$. The closing velocity is given by $V_c = \|V_{Tint}\| \cos\theta_T + \text{VMAR}\cos\theta_M$. The updated time-to-go is calculated using the equation $$T_{go} = \frac{\|X_{M,T'}\|}{V_c}.$$

The updated intercept time is calculated using the equation $T_{int} = T_{now} + T_{go}$.

Step 4: Compute the updated elevated PIP 727 as Updated Elevated PIP=$T_L' + V_{Tint}T_{go}$, where $T_L'$ 715 is the elevated linear target position, $V_{Tint}$ 712 is the target velocity vector at intercept, and $T_{go}$ is the updated time-to-go calculated in Step 3 above.

The updated intercept triangle now has vertices at the waypoint 704, at the updated elevated predicted intercept point (PIP) 727, and at the elevated linear target position $T_L'$ 715. The desired direction of the interceptor missile's velocity vector at the waypoint 704 is shown as arrow 724 pointing from the waypoint 704 to the updated elevated PIP 727.

When the intercept triangle 700 has been updated in block 416 as described in conjunction with FIG. 7, the logic 400 of FIG. 4 flows from block 416 to a further block 422. Block 422 represents determination of the average missile velocity remaining (VMAR)-to-Intercept. VMAR-to-Intercept block 422 of FIG. 4 calculates an updated average remaining missile velocity (VMAR$_{updated}$ 724) along the path 726 extending from the missile's waypoint position 704 to the updated elevated PIP 727, in the time interval between the waypoint and the updated elevated PIP. VMAR$_{updated}$ 724 is calculated using the equation $$\text{VMAR}_{updated} = \frac{\Delta X_{ref}}{T_{go}},$$

where $T_{go}$ is the updated time-to-go to intercept and $\Delta X_{ref}$ is the magnitude of the interceptor missile's positional change along the reference line 726 extending between the waypoint 704 and the updated elevated PIP 727. FIG. 7 illustrates VMAR$_{updated}$ 724, the reference line 726, the waypoint 704, and the updated elevated PIP 727.

From block 422 of FIG. 4, the logic 400 flows to a Second Stage Acceleration Commands block 426. Second Stage Acceleration Commands block 426 calculates the second stage midcourse guidance acceleration commands that will guide the interceptor missile to achieve the desired direction (724) of the interceptor missile's velocity vector at the waypoint, as calculated in block 416 of FIG. 4. The acceleration commands are calculated using an appropriate guidance law and will cause the interceptor missile to fly through the prescribed waypoint position with its relative velocity vector pointing in the prescribed direction (724), as determined by the generalized midcourse guidance (GMCG) system. The generation of interceptor missile guidance acceleration commands up to Waypoint and determining average remaining velocity is well known to those skilled in the art, and requires no further elaboration. The missile guidance acceleration commands are uplinked to the interceptor missile, as suggested by path 430 of FIG. 4.

From block 426, the logic 400 of FIG. 4 flows back to Elevated PIP block 414 through Next Update block 428, iteratively repeating the steps of generating the elevated PIP in block 414, generating and updating an intercept triangle in block 416, determining the average remaining missile velocity (VMAR) until intercept in block 422, and calculating 2$^{nd}$ stage acceleration commands in block 426 to send to the interceptor missile. Each successive iteration through the GMCG loop in FIG. 4 may use the updated variables from the previous iteration. The iterations continue until completion of second-stage midcourse guidance, where completion is defined as the reaching of the waypoint by the interceptor missile with the desired flight path angle 724 calculated by the GMCG system in the Intercept Triangle block 416 of FIG. 4. The waypoint is illustrated in FIGS. 5, 6, and 7 by the points 504, 604, and 704, respectively.

A method according to an aspect of the invention is for guiding a multistage interceptor missile (250) toward a target missile (225a), where the target missile (225a) may transition from a boost mode to a ballistic mode. The method comprises the step of tracking the position of the target missile (225a) with a sensor (240a) to determine its location. A pre-interceptor-missile-launch predicted intercept point (PIP) and predicted intercept time are generated, and the predicted intercept point (503, 603) and time are loaded into the interceptor missile (250) guidance (320). The interceptor missile (250) is launched, and the first-stage guidance (356) is controlled at least in response to the target missile (225a) bearing and elevation toward the predicted intercept point (503, 603). The interceptor missile (250) is transitioned (358) to the second stage of propulsion, and the second-stage guidance (360) is controlled in response to second-stage acceleration commands (426). The second-stage acceleration commands (426) are generated in response to an elevated predicted intercept point (506, 606, 706). The elevated predicted intercept point (506, 606, 706) is generated by adjusting a predicted intercept point (503, 603) to account for the effects of interceptor missile (250) velocity at waypoint (504, 604, 704), interceptor missile (250) propulsion beyond second stage, and gravity between the waypoint (504, 604, 704) and the predicted intercept point (503, 603). The predicted intercept point (503, 603) is generated using the Runge-Kutta integration method (414) working on predicted target missile (225a) position, velocity, and acceleration. The propulsion of the interceptor missile (250) is transitioned (362) to the third stage, and the interceptor missile (250) performs autonomous, possibly inertial, guidance toward the target missile (225a). The propulsion of the interceptor missile (250) is transitioned to a fourth stage. The fourth stage or kinetic warhead may use autonomous guidance (366), possibly using information from the ship. The autonomous guidance (366) of the fourth stage to intercept the target missile (225a) may be a modified version of proportional navigation.

Another mode of the method includes the step of generating the second-stage acceleration commands (426) in response to an elevated predicted intercept point (506, 606, 706) generated using the Runge-Kutta integration method. This mode of the method comprises the step (410) of initialization, the step (414) of generating an elevated predicted intercept point (506, 606, 706) via the Runge-Kutta method, the step (416) of generating and updating an intercept triangle, the step (422) of calculating the average remaining missile velocity (VMAR) until intercept, and the step (426) of calculating 2$^{nd}$ stage acceleration commands. The initialization step (410) in this mode of the method involves initializing a second-stage midcourse guidance (360, 400) algorithm with at least the pre-interceptor-missile-launch predicted intercept point (503, 603), predicted intercept time, and waypoint (504, 604, 704). The step (414) of generating an elevated predicted intercept point (506, 606, 706) involves calculating the current estimate of target missile (225a) position and velocity at the predicted intercept point (503, 603) using the Runge-Kutta integration technique, which uses the current and future predictions of the target missile (225a) position, velocity, and acceleration including target missile (225a) boost acceleration, and then creating an elevated predicted intercept point (506, 606, 706) by adjusting the predicted intercept point (503, 603) to account for the effects of interceptor missile (250) velocity at waypoint (504, 604, 704), interceptor missile (250) propulsion beyond second stage, and gravity between the waypoint (504, 604, 704) and the predicted intercept point (503, 603). The step (416) of generating and updating an intercept triangle (600, 700) involves calculating the desired direction (724) of the interceptor missile's (250) velocity vector at the waypoint (504, 604, 704), the time ($T_{go}$) until the predicted intercept point (503, 603), and the elevated predicted intercept point (506, 606, 706), using the average remaining interceptor missile (250) velocity (VMAR) from the waypoint (504, 604, 704) to the predicted intercept point (503, 603), and constructing the intercept triangle (600, 700) with the three vertices defined by the waypoint (504, 604, 704) position of the interceptor missile (250), the elevated linear target missile position (615, 715), and the elevated predicted intercept point (506, 606, 706), where the elevated linear target missile position (615, 715) is calculated by taking the product of predicted target missile (225a) velocity at the predicted intercept point (PIP 503, 603) and estimated time ($T_{go}$) until the predicted intercept point (PIP 503, 603), and then subtracting that product from the elevated predicted intercept point (506, 606, 706). The step (422) of determining an updated average remaining missile velocity (VMAR) involves calculating the interceptor missile's (250) velocity from the waypoint (504, 604, 704) position to the updated elevated predicted intercept point (727), in the time interval between the waypoint (504, 604, 704) and the predicted intercept point (PIP 503, 603). The step (426) of generating the second-stage generalized midcourse guidance acceleration commands involves using an appropriate guidance law such as the vector gravity-optimized orthogonal navigation algorithm, which calculates interceptor missile (250) acceleration commands that cause the interceptor missile (250) to fly through the waypoint (504, 604, 704) position with its relative velocity vector pointing in the direction (724) calculated as part of the step (416) of generating and updating an intercept triangle (700).

According to another mode of the method, following the step (426) of generating second-stage interceptor missile (250) acceleration commands, iteratively repeating, in order, the step (414) of generating an elevated predicted intercept point (506, 606, 706) via the Runge-Kutta method, the step (416) of generating and updating an intercept triangle, the step (422) of calculating the average remaining missile velocity (VMAR) until intercept, and the step (426) of calculating $2^{nd}$ stage acceleration commands. Each successive iteration through the GMCG loop may use the updated parameters from the previous iteration. The step (414) of generating the elevated predicted intercept point (506, 606, 706) involves calculating the current estimate of target missile (225a) position and velocity at the predicted intercept point (503, 603) using the Runge-Kutta integration technique, which uses the current and future predictions of the target missile (225a) position, velocity, and acceleration including target missile (225a) boost acceleration, and then creating an elevated predicted intercept point (506, 606, 706) by adjusting the predicted intercept point (503, 603) to account for the effects of interceptor missile (250) velocity at waypoint (504, 604, 704), interceptor missile (250) propulsion beyond second stage, and gravity between the waypoint (504, 604, 704) and the predicted intercept point (503, 603). The step (416) of generating and updating an intercept triangle (600, 700) involves updating the desired direction (724) of the interceptor missile's (250) velocity vector at the waypoint (504, 604, 704), the time ($T_{go}$) until the predicted intercept point (PIP 503, 603), and the elevated predicted intercept point (506, 606, 706), using the average remaining interceptor missile (250) velocity (VMAR) from the waypoint (504, 604, 704) to the predicted intercept point (PIP 503, 603), and constructing the intercept triangle (600, 700) with the three vertices defined by the waypoint (504, 604, 704) position of the interceptor missile (250), the elevated linear target missile position (615, 715), and the elevated predicted intercept point (506, 606, 706), where the elevated linear target missile position (615, 715) is calculated by taking the product of predicted target missile (225a) velocity at the predicted intercept point (PIP 503, 603) and estimated time ($T_{go}$) until the predicted intercept point (PIP 503, 603), and then subtracting that product from the elevated predicted intercept point (506, 606, 706). The step (422) of determining an updated average remaining missile velocity (VMAR) involves calculating the interceptor missile's (250) velocity from the waypoint (504, 604, 704) position to the updated elevated predicted intercept point (727), in the time interval between the waypoint (504, 604, 704) and the predicted intercept point (PIP 503, 603). The step (426) of generating the second-stage generalized midcourse guidance acceleration commands involves using an appropriate guidance law such as the vector gravity-optimized orthogonal navigation algorithm, which calculates interceptor missile (250) acceleration commands that cause the interceptor missile (250) to fly through the prescribed waypoint (504, 604, 704) position with its relative velocity vector pointing in the direction (724) calculated as part of the step (416) of generating and updating an intercept triangle (700).

In another mode of a method according to an aspect of the invention, the step of generating the elevated predicted intercept point (506, 606, 706) from the current target missile (225a) position, velocity, acceleration, and future target missile (225a) acceleration prediction, by integrating current target missile (225a) state to future predicted intercept point (PIP 503, 603), using the Runge-Kutta method, to produce the predicted intercept point (PIP 503, 603), then adjusting the PIP (503, 603) to account for the effects of interceptor missile (250) velocity at waypoint (504, 604, 704), interceptor missile (250) propulsion beyond second stage, and gravity between the waypoint (504, 604, 704) and the predicted intercept point (PIP 503, 603) to produce the elevated predicted intercept point (506, 606, 706).

What is claimed is:

1. A method for guiding a multistage interceptor missile toward a target missile, said method comprising the steps of:
   tracking a position of said target missile with a sensor;
   generating a pre-interceptor-missile-launch predicted intercept point and a predicted intercept time, and loading the predicted intercept point and time into an interceptor missile guidance;
   launching said interceptor missile, and controlling a first-stage guidance in response to target missile bearing and elevation at the predicted intercept point;

transitioning to a second stage of propulsion of said interceptor missile;
controlling second-stage guidance in response to second-stage acceleration commands;
generating said second-stage acceleration commands in response to an elevated predicted intercept point generated by adjusting the predicted intercept point to account for effects of interceptor missile velocity at waypoint, interceptor missile propulsion beyond second stage, and gravity between the waypoint and the predicted intercept point, which predicted intercept point is generated using a Runge-Kutta integration method working on predicted target missile position, velocity, and acceleration;
transitioning to a third stage of propulsion of said interceptor missile;
guiding said third stage toward said target missile; and
transitioning to a fourth stage of interceptor missile flight and guiding interceptor missile to intercept said target missile.

2. A method according to claim 1, wherein said step of generating said second-stage acceleration commands includes the steps of:
initializing a second-stage midcourse guidance algorithm with at least the pre-interceptor-missile-launch predicted intercept point, predicted intercept time, and waypoint;
generating said elevated predicted intercept point by calculating a current estimate of target missile position and velocity at said predicted intercept point using the Runge-Kutta integration technique which uses current and future predictions of the target missile position, velocity, and acceleration including target missile boost acceleration, and estimating said elevated predicted intercept point by adjusting said predicted intercept point to account for effects of interceptor missile velocity at waypoint, interceptor missile propulsion beyond second stage, and gravity between the waypoint and the predicted intercept point;
generating and updating an intercept triangle by calculating a direction of the interceptor missile's velocity vector at the waypoint, the time until the predicted intercept point, and the elevated predicted intercept point, using an average remaining interceptor missile velocity (VMAR) from the waypoint to the predicted intercept point, said intercept triangle being generated and updated with three vertices defined by the waypoint position of the interceptor missile, elevated linear target missile position, and the elevated predicted intercept point, where the elevated linear target missile position is calculated by taking the product of predicted target missile velocity at predicted intercept point and estimated time until predicted intercept point, and subtracting that product from the elevated predicted intercept point;
determining an updated average remaining missile velocity (VMAR) from the interceptor missile's waypoint position to the updated elevated predicted intercept point, in a time interval between the waypoint and predicted intercept point; and
generating the second-stage acceleration commands using a guidance law which calculates interceptor missile acceleration commands that cause the interceptor missile to fly through the waypoint position with its relative velocity vector pointing in the direction calculated as part of said process of generating and updating said intercept triangle.

3. A method according to claim 2, wherein, following said step of generating second-stage interceptor missile acceleration commands, iteratively repeating said steps of:
generating said elevated predicted intercept point by calculating the current estimate of target missile position and velocity at said predicted intercept point using the Runge-Kutta integration technique which uses the current and future predictions of the target missile position, velocity, and acceleration including target missile boost acceleration, and estimating said elevated predicted intercept point by adjusting said predicted intercept point to account for the effects of interceptor missile velocity at waypoint, interceptor missile propulsion beyond second stage, and gravity between the waypoint and the predicted intercept point;
generating and updating an intercept triangle by calculating the direction of the interceptor missile's velocity vector at the waypoint, the time until the predicted intercept point, and the elevated predicted intercept point, using the average remaining interceptor missile velocity (VMAR) from the waypoint to the predicted intercept point, said intercept triangle being generated and updated with the three vertices defined by the waypoint position of the interceptor missile, the elevated linear target missile position, and the elevated predicted intercept point, where the elevated linear target missile position is calculated by taking the product of predicted target missile velocity at predicted intercept point and estimated time until predicted intercept point, and subtracting that product from the elevated predicted intercept point;
determining an updated average remaining missile velocity (VMAR) from the interceptor missile's waypoint position to the updated elevated predicted intercept point, in the time interval between the waypoint and predicted intercept point; and
generating the second-stage acceleration commands using a guidance law which calculates interceptor missile acceleration commands that cause the interceptor missile to fly through the waypoint position with its relative velocity vector pointing in the direction calculated as part of said process of generating and updating said intercept triangle.

4. A method according to claim 2, wherein the guidance law comprises a vector gravity-optimized orthogonal navigation algorithm.

5. A guidance system for guiding a multistage interceptor missile toward a target missile, said guidance system comprising:
a target missile tracking sensor for determining a location of said target missile;
a processor associated with said target missile tracking sensor for determining a pre-interceptor-launch predicted intercept point and a predicted intercept time, and for loading the pre-interceptor-missile-launch predicted intercept point and time into an interceptor missile guidance;
a launching arrangement coupled to the processor arrangement, for launching said interceptor missile, and for controlling a first-stage guidance of said interceptor missile in response to at least target missile bearing and elevation at said pre-interceptor-missile-launch predicted intercept point;
a control transitioner for transitioning said propulsion of said interceptor missile to a second stage of propulsion of said interceptor missile;

a second-stage guidance controller for controlling the second-stage guidance of said interceptor missile toward a waypoint in response to second-stage acceleration commands;

a second-stage acceleration command generator for generating a predicted intercept point using a Runge-Kutta integration method, using predicted target missile position, velocity, and acceleration, and for generating said second-stage acceleration commands in response to an elevated predicted intercept point generated by adjusting said predicted intercept point to account for effects of interceptor missile velocity at said waypoint, interceptor missile propulsion beyond second stage, and gravity between said waypoint and said predicted intercept point; and a further guidance processor coupled to said interceptor missile for guiding stages of said interceptor missile beyond said second stage toward said target missile.

6. The guidance system of claim 5, wherein the target missile tracking sensor comprises a radar system.

7. The guidance system of claim 5, wherein the target missile tracking sensor comprises an overhead non-imaging infrared sensor.

8. The guidance system of claim 5, wherein the target missile tracking sensor comprises a space based sensor.

9. The guidance system of claim 5, wherein the launching arrangement comprises a shipboard launcher.

10. The guidance system of claim 5, wherein the launching arrangement comprises a land-based launcher.

11. The guidance system of claim 5, wherein the target missile tracking sensor and the launching arrangement are co-located.

12. A method for guiding a multistage interceptor missile toward a target missile, said method comprising the steps of:
tracking a position of said target missile;
generating a pre-interceptor-missile-launch predicted intercept point and a predicted intercept time;
launching said interceptor missile and controlling a first-stage guidance of said interceptor missile in response to a bearing and an elevation of the target missile at the predicted intercept point;
transitioning to a second stage of propulsion of said interceptor missile;
controlling a second-stage guidance of said interceptor missile by generating second-stage acceleration commands in response to a modified predicted intercept point generated by adjusting the predicted intercept point to account for effects of interceptor missile velocity at a waypoint, interceptor missile propulsion beyond second stage, and gravity between the waypoint and the predicted intercept point;
transitioning to a third stage of propulsion of said interceptor missile;
guiding said third stage toward said target missile; and
transitioning to a fourth stage of interceptor missile flight and guiding said interceptor missile to intercept the target missile.

13. The method of claim 12, wherein the predicted intercept point is generated using a Runge-Kutta integration method.

14. The method of claim 12, wherein said step of generating second-stage acceleration commands includes the steps of:
initializing a second-stage midcourse guidance algorithm with at least the pre-interceptor-missile-launch predicted intercept point, predicted intercept time, and waypoint;
generating said elevated predicted intercept point by calculating the current estimate of target missile position and velocity at said predicted intercept point using a Runge-Kutta integration technique;
generating and updating an intercept triangle by calculating a desired direction of the interceptor missile's velocity vector at the waypoint, the time until the predicted intercept point, and the elevated predicted intercept point, using the average remaining interceptor missile velocity (VMAR) from the waypoint to the predicted intercept point;
determining an updated average remaining missile velocity (VMAR) from the interceptor missile's waypoint position to the updated elevated predicted intercept point, in the time interval between the waypoint and predicted intercept point; and
generating the second-stage acceleration commands using a guidance law.

15. The method of claim 14, wherein said intercept triangle is generated and updated with the three vertices defined by the waypoint position of the interceptor missile, the elevated linear target missile position, and the elevated predicted intercept point.

16. The method of claim 15, wherein the elevated linear target missile position is determined by taking the product of predicted target missile velocity at predicted intercept point and estimated time until predicted intercept point, and subtracting that product from the elevated predicted intercept point.

17. The method of claim 14, wherein the guidance law calculates interceptor missile acceleration commands that cause the interceptor missile to fly through the waypoint position with its relative velocity vector pointing in the direction calculated as part of said process of generating and updating said intercept triangle.

18. The method of claim 17, wherein the guidance law is a vector gravity-optimized orthogonal navigation algorithm.

* * * * *